GRAPH 2

GRAPH 1

GRAPH 4
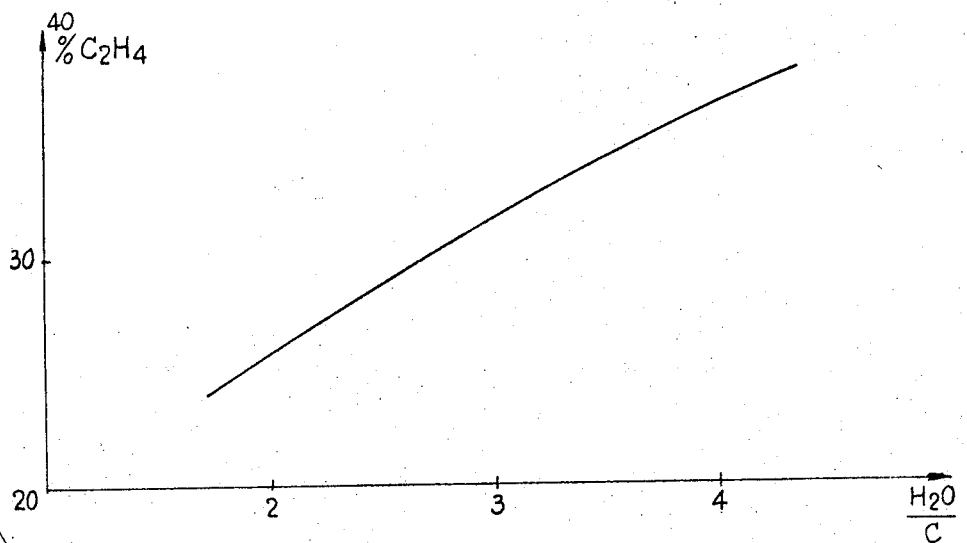
FIG. 2
GRAPH 3
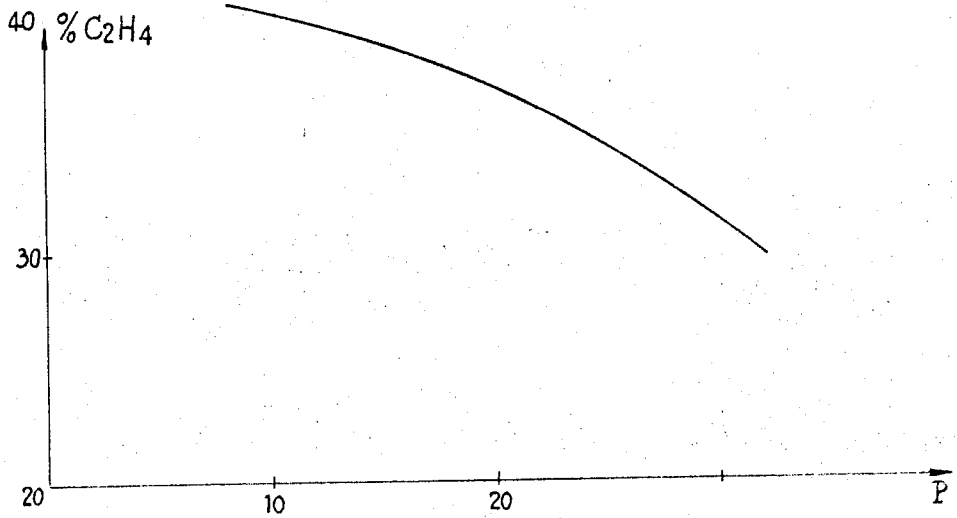

United States Patent Office 3,644,557
Patented Feb. 22, 1972

3,644,557
CATALYST COMPOSITIONS FOR PREPARING ETHYLENE
Michel Senes, Saint Nazaire, Pierre Lhonore, Doual, and Jacques Quibel, Maisons-Laffitte, France, assignors to Société Chimique de la Grande Paroisse, Azote et Produits Chimiques
Filed May 26, 1969, Ser. No. 827,756
Claims priority, application France, May 30, 1968, 153,371
Int. Cl. B01j 11/42; C07c 3/34, 11/02
U.S. Cl. 260—683 R
19 Claims

ABSTRACT OF THE DISCLOSURE

Catalyst compositions can be used in the preparation of ethylene and propylene by reforming hydrocarbons with steam, the catalyst having a limited porosity and containing at least one oxide of the metals of the group formed by the rare earths and antimony, of which the content by weight, as oxide, is between 1 and 4%, in association with a mixture of refractory oxides with high magnesium oxide content of which the content by weight is between 30 and 70%, and of zirconium dioxide, of which the content is between 25 and 40%. Catalyst compositions containing a high content of magnesium from 50 to 70% by weight and a low alumina content which is at most 20% by weight and possibly CuO. Applications of these compositions.

---

Figure 1:
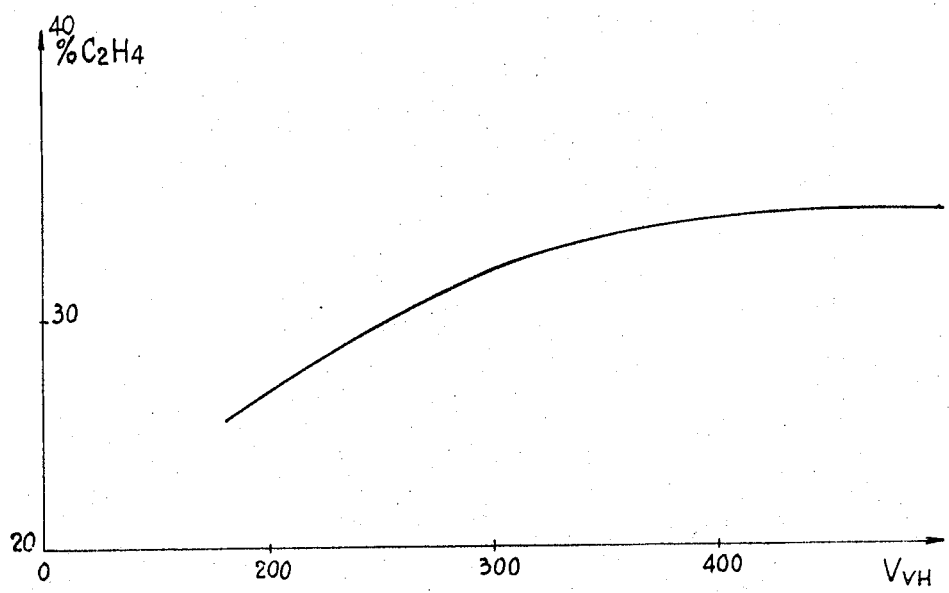
Figure 1:
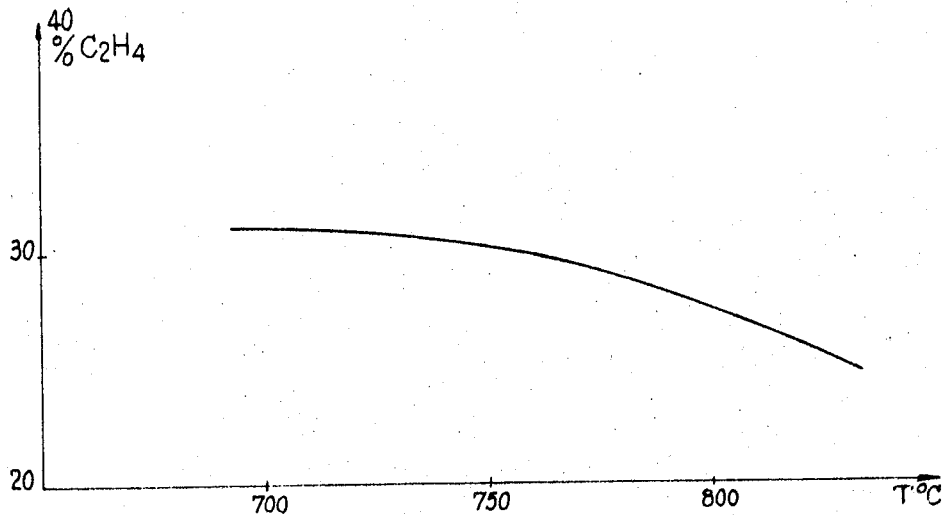

This invention relates to the catalytic treatment of hydrocarbons and, more particularly but not exclusively, is concerned with catalyst compositions and processes using the same for preparing ethylene or mixtures containing a high ethylene content.

Industrial processes for the thermal treatment of hydrocarbons with the object of preparing ethylene are well known. One such process, which is described in U.S. Pat. 2,986,532, includes the step of thermally treating vaporised hydrocarbons in the presence of a catalyst containing mixtures of non-dehydrogenating oxides which are not reduced under the process conditions. However, this process requires the use of low pressures and does not permit high ethylene yields to be achieved.

According to one aspect of the present invention there is provided a catalyst composition for use in a hydrocarbon reforming process which has a limited porosity and a specific surface in the range of from 0.02 to 1 m.²/g.

Catalyst compositions in accordance with the invention make it possible to produce gases containing high contents of ethylene or gases containing both ethylene and propylene without the disadvantages of depositions of carbon and gums in the tubes and pipelines, which substances are formed in the known purely thermal cracking processes, and with increased yield of the desired olefinic material as compared with that obtained by the process disclosed in U.S. Pat. 2,986,532.

The catalyst compositions of the invention enable a wide variety of process conditions to be employed.

The catalyst compositions of the invention, without any dehydrogenating metal or with metals having a small dehydrogenating effect, are generally composed of refractory oxides of limited porosity and with a specific surface which is between 0.02 and 1 m.²/g. and are resistant to the temperatures and pressures being used.

Preferred catalyst compositions in accordance with the invention are characterised in that they contain one or more oxides of the rare earth metals and of antimony, of which the content by weight, calculated as the oxide, lies in the range of from 1 to 4%, and a mixture of refractory oxides comprising from 30 to 70% by weight of magnesia and from 25 to 40% by weight of zirconia.

All the rare earth oxides can be used but lanthanum, neodymium and cerium oxides are preferred.

It may be advantageous with some compositions to include a small content by weight of an oxide which can be reduced, for example oxides of iron such as $Fe_2O_3$ and $Fe_3O_4$. These oxides, which can be reduced, impart to the catalytic compositions containing them good stability with respect to ethylene.

Some compositions in accordance with the invention can contain oxides of cobalt or titanium, generally in an amount ranging from 0 to 15% by weight, preferably 10 to 15%.

In accordance with the invention it is found that an efficient composition is obtained when there is a high magnesia content, between 50 and 70%.

The catalyst compositions contain a high content of magnesia, can be as much as from 50 to 70% by weight and a low alumina content which is at most 20% by weight.

Certain compositions containing a high content of magnesia and copper oxide, CuO, generally in an amount ranging from 10 to 15% by weight, are very interesting.

The catalyst compositions of the invention can also contain one or more of calcium oxide, barium oxide, silicon dioxide, aluminum oxide and titanium oxide. Preferably, the amount of these oxides present in the catalyst composition of the invention is as follows:

| | Percent by weight |
|---|---|
| CaO | 1–10 |
| BaO | 0–2 |
| $SiO_2$ | 6–16 |
| $Al_2O_3$ | 0–40 |
| $TiO_2$ | 0–15 |

The catalyst compositions of the invention are prepared by solution diffused into the mass, which is preferably carried out by sintering at high temperature, at least equal to 1300° C.

The catalyst compositions of the invention are advantageously provided in the form of pellets, of which the dimensions vary from 10 to 15 mm. in diameter and about 6 mm. to 15 mm. in height, or in the form of rings, for example Raschig rings of the same dimensions as before and, formed with a hole having a diameter of 5 to 8 mm.

According to another aspect of the invention there is provided processes for reforming hydrocarbons using the catalyst of the invention.

The catalyst compositions of the invention give good results with hydrocarbons ranging from liquefied petroleum gases to heavy fuel oils. Examples of such hydrocarbons are propane, butane, liquid hydrocarbons with a boiling point below 100° C. Such as the pentanes, light petroleum fractions, such as domestic fuels and the "naphtha" fractions, of which the boiling point is in general between 100 and 250° C., and heavy hydrocarbons.

The catalytic compositions of the invention have the advantage that they can be used in the presence of up to 50 p.p.m. of sulphur, which is transformed into $H_2S$.

The exact nature of the catalyst compositions is selected according to the process conditions and dependent upon the reformed hydrocarbon material, the reforming pressure and the composition of the expected effluent gas.

One process according to the invention advantageously uses reforming pressures which are between 1 and 30 bars and higher, up to a maximum of 50 bars, and $H_2O/C$ vapour ratios, calculated by weight, which are between approximately 1 and approximately 5, preferably from 2 to 4. It has been found that this ratio can in certain cases be lowered to the stoichiometric ratio.

It has been observed that the residue, depending on operating conditions, e.g. volumetric speed of the hydrocarbons to be reformed, temperature, etc., does not normally exceed 10% of the entrant material, and can sometimes reach low values. The recycling of a fraction of the methane or ethane contained in the effluent gas generally increases the yield of ethylene.

The spatial velocity, representing the quotient of the hourly gaseous delivery of the hydrocarbons with a boiling point lower than 100° C. with the volume of the catalyst in the same unit varies from 230 to 5000, preferably from 300 to 500 for a volatile oil with a boiling point below 100° C., from 500 to 3000 for butane and from 500 to 5000 for propane. In the case of liquid hydrocarbons, such as fuel oils, the hourly volumetric velocity in litres per litre of catalyst varies between 200 and 1000.

The temperature on entering the reforming tubes generally lies between 200° C. and 600° C., while the outlet temperature generally lies between 700° C. and 900° C.

The internal diameter of the reforming tubes is chosen according to the activity of the catalyst, the desired surface temperature of the tube, the heat transfer flux and the type of furance. It is normally between 25 and 150 mm. and preferably between 40 and 100 mm.

Examples illustrating the invention are given below.

EXAMPLE 1

| Components | Catalyst compositions, percent by weight | | | | | | |
|---|---|---|---|---|---|---|---|
| | A1 | A2 | A3 | A4 | A5 | A6 | A7 |
| Lanthanum as $La_2O_3$ | 2.1 | | | 1.35 | | | |
| Neodymium as $Nd_2O_3$ | | 2.1 | | 1.45 | | 1 | 2.14 |
| Cerium as $Ce_2O_3$ | | | 2.1 | 1.48 | | | |
| Antimony as $Sb_2O_3$ | | | | | 3.10 | | |

| Components | Catalyst compositions, percent by weight | | | | | | |
|---|---|---|---|---|---|---|---|
| | A1 | A2 | A3 | A4 | A5 | A6 | A7 |
| Titanium as $TiO_2$ | | | | | | 14 | |
| Cobalt as $Co_3O_4$ | | | | | | | 12.5 |
| $Fe_2O_3$ | | | | 0.29 | 0.27 | 0.27 | 12.5 |
| Barium oxide BaO | | | | | 1.27 | | |
| Magnesium oxide MgO | 36 | 36 | 36 | 36.52 | 34.20 | 34.45 | 28.5 |
| Zirconium dioxide $ZrO_2$ | 43.8 | 43.8 | 43.8 | 41.35 | 43.45 | 32.9 | 25.6 |
| Calcium oxide CaO | 1 | 1 | 1 | 1.04 | 0.99 | 0.98 | |
| Aluminium oxide $Al_2O_3$ | 0.3 | 0.3 | 0.3 | 0.29 | 0.27 | 0.27 | |
| Silicon dioxide $SiO_2$ | 16.8 | 16.8 | 16.8 | 16.44 | 16.74 | 16.34 | 8.65 |

EXAMPLE 2

The reforming tests were carried out in a pilot installation, of which the tube had an internal diameter of 15 mm. and a length of 1.5 metres. The hydrocarbon being treated was a light petroleum fraction having the empirical formula $C_{5.69}H_{13.10}$, containing 50 p.p.m. of sulphur and an ASTM boiling point between 31° and 90° C.

The tests were carried out at 1 bar, 20 bars and 30 bars.

The vapour ratio values, the ratio of the number of water molecules per atom of carbon, were between 2 and 4.5.

The spatial velocity representing the quotient of the hourly gaseous delivery of volatile oil related to the volume of catalyst in the same unit varied from 230 to 520.

The results obtained when the reforming tube was charged with the catalyst composition A2 are set out in the following Table I:

TABLE I

| Yield of $C_2H_4$ by weight | Pressure in bars | Analysis of the gas in percent by volume | | | | | | | | |
|---|---|---|---|---|---|---|---|---|---|---|
| | | $H_2$ | CO | $CH_4$ | $C_2H_6$ | $CO_2$ | $C_2H_4$ | $C_3$ | $C_4$ | $C_5$ |
| 38.8 | 1 | 18 | 0.5 | 20 | 2 | 1 | 36 | 11.5 | 7 | 2.5 |
| 39.1 | 20 | 20 | 1.5 | 40 | 5 | 2 | 25 | 5 | 1.5 | |
| 34.7 | 30 | 14.6 | 1.5 | 46.5 | 8 | 0.3 | 23 | 5 | 1 | 0.1 |

EXAMPLE 3

The influence of the main parameters on the yield of ethylene was determined in the case where a light petroleum fraction of empirical formula $C_{5.69}H_{13.10}$, was reformed on the catalyst composition A2.

(a) Outlet temperature

The reforming was carried out at 30 bars, the spatial velocity was 220 and the vapour ratio $$\frac{H_2O}{C} = 3.7$$

The outlet temperature varied from 680° to 860° C.

Graph 1 in the accompanying drawing, on which the outlet temperatures (T° C.) are plotted on the abscissae and the yields by weight of ethylene ($C_2H_4\%$) are plotted as ordinates, shows that the raising of the temperature causes a reduction in the total yield of ethylene. The liquid residue decreases under these conditions, but the discharging gas becomes lighter. The most advantageous yield under the conditions indicated in graph 1 of the accompanying drawing is reached at approximately 700° C.

(b) Volumetric speed of the reformed hydrocarbon

The reforming carried out at 30 bars, the outlet temperature of the tube was 800° C. and the vapour ratio (steam/carbon) was 3.7.

Graph 2 of the accompanying drawing, in which the volumetric speeds of the reformed light fraction are plotted as abscissae and the yields as a percentage by weight of ethylene ($C_2H_4\%$) are plotted as ordinates, shows that the raising of the volumetric speed increases the yield of ethylene up to a limit which, under the conditions of the graph, is at a value of 500 in h.v.s. (hourly volumetric speed).

(c) Pressure

The reforming was carried out at pressures of 10, 20 and 30 bars, the outlet temperature of the tube was 800° C., the vapour ratio ($H_2O/C$) was 2.8 and the hourly volumetric speed was 320.

Graph 3 of the accompanying drawing, on which the pressures in bars (P) are plotted as abscissae and the yields of ethylene, expressed in percent by weight ($C_2H_4$) are plotted as ordinates, shows that raising the vapour ratio increases the yield. However, it can be estimated that with ratios of 3 to 4, calculated as $H_2O/C$, the increase in yield does not fully justify the heat consumption, due to the condensation of vapour.

(d) Recycling of the methane

The reforming was carried out at a pressure of 30 bars, the outlet temperature of the tube was 800° C., the vapour ratio ($H_2O/C$) varied from 1.7 to 4.3 and the volumetric speed of the hydrocarbon to be treated was 500 (h.v.s.).

Graph 4 of the accompanying drawing, in which the vapour ratios $H_2O/C$ are plotted as abscissae and the yield of ethylene as percent by weight ($C_2H_4\%$) are plotted as ordinates, shows that the yield increases on injecting the methane withdrawn in the effluent gas. This increase is about 25% at most and in the most favourable case, studied in a laboratory, this permits a yield of 50% to be obtained for a pressure of 15 bars, a volumetric speed (h.v.s.) of 390, a vapour ratio of 2.7 at 800° C., at the outlet, in the case of a ratio of $$\frac{\text{injected } CH_4 \text{ gas}}{\text{gas produced}} = 1$$

this corresponding to an external supply of methane.

EXAMPLE 4

Using a tube identical to that described in Example 2, a light petroleum fraction of the empirical formula $C_{5.69}H_{13.10}$ was treated, the said fraction being successively reformed on the catalysts A1, A2, A3, A4, A5 and A6.

The results of tests are set out in the following Table II:

TABLE II

| | Analysis of the gas on outlet | | | | | | H₂O/C | H.v.s. gas | P. bar | Percent trans- formation | Temperatures | | |
|---|---|---|---|---|---|---|---|---|---|---|---|---|---|
| | H₂ | CO | CO₂ | CH₄ | C₂H₆ | C₂H₄ | | | | | Inlet | Average | Outlet |
| A1 | 23.5 | 0.6 | 5.9 | 35.1 | 7.4 | 20.2 | 3.61 | 236 | 30 | 85.8 | 240 | | 810 |
| A2 | 18.3 | 0.4 | 1.6 | 37.8 | 6.1 | 25.8 | 3.8 | 236 | 30 | 91.3 | 260 | | 750 |
| A3 | 18.5 | 0.8 | 2.1 | 34.7 | 5.8 | 27.8 | 3.49 | 207 | 30 | 93.3 | 240 | | 690 |
| A4 | 32.5 | 0.59 | 2.3 | 31.72 | 5.6 | 17 | 4 | 248 | 30 | 98 | 410 | | 720 |
| A5 | 18.32 | 4.03 | 1.56 | 41 | 7.92 | 21.21 | 3.84 | 251 | 30 | 99 | 370 | 610 | 620 |
| A6 | 27 | 2.66 | 5.15 | 41 | 5.85 | 16 | 5.27 | 350 | 30 | 90 | 350 | 740 | 850 |
| A7 | 25 | 2.64 | 5.10 | 23.5 | 1.6 | 31.30 | 4.22 | | 1 | 100 | 380 | 750 | 850 |

EXAMPLE 5

Using a tube identical with that described in Example 4, a light petroleum fraction of formula $C_{5.69}H_{13.10}$ was treated, reforming it on a catalyst A8 of the following composition:

Magnesium oxide ------------------------------ 65.00
Calcium oxide -------------------------------- 9.30
Silicon dioxide ------------------------------- 0.64
$Fe_2O_3$ -------------------------------------- 0.88
Aluminium oxide ------------------------------ 18.45
Zirconium dioxide ---------------------------- 2
Potassium oxide ------------------------------ 1.70
Chromium oxide ------------------------------ 0.60
$Fe_3O_4$ ------------------------------------- 1.18

The results are set out in the following Table III:

TABLE III

| Analysis at outlet | | | | | | H₂O/C | H.v.s. gas | P. bar | Percent transfor- mation | Temperatures | | |
|---|---|---|---|---|---|---|---|---|---|---|---|---|
| H₂ | CO | CO₂ | CH₄ | C₂H₆ | C₂H₄ | | | | | Inlet | Average | Outlet |
| 16.35 | 0 | 0.75 | 41.10 | 8.6 | 23.37 | 3.95 | 237 | 30 | 85 | 360 | 575 | 690 |

EXAMPLE 6

The reforming tests were effected in a pilot installation, of which the tube had an internal diameter of 15 mm. The treated hydrocarbon was commercial pentane, containing 1 p.p.m. of sulphur.

The tests were carried out at a pressure of 30 bars. The values of the vapour ratio, the ratio of the number of water molecules per atom of carbon, calculated by weight, were between 2 and 4.5. The hourly volumetric speed of the entrant gas (m.³/h. at n.t.p.) per cubic metre of catalyst was between 300 and 1200.

The results obtained are also satisfactory when the tube is charged with the catalyst composition A2, the catalyst composition A8 or the catalyst A9, of which the composition is close to the following composition:

Magnesium oxide ------------------------------ 59
Calcium oxide -------------------------------- 8.5
Silicon dioxide ------------------------------- 0.6
$Fe_2O_3$ -------------------------------------- 0.8
Aluminum oxide ------------------------------- 16.5
Zirconium dioxide ---------------------------- 1.70
Chromium oxide ($CrO_3$) --------------------- 0.5
Cuprous oxide (CuO) -------------------------- 12

The results obtained are set out in the following Table IV:

TABLE IV

| Analysis of gas at outlet | | | | | | | H₂O/C | H.v.s. gas | P. bar | Yield, C₂H₄ | | Temperatures | | |
|---|---|---|---|---|---|---|---|---|---|---|---|---|---|---|
| | | | | | | | | | | Ethane recy- cling | Without recy- cling | C₃H₆ | In- let, °C. | Out- let, °C. |
| H₂ | CO | CO₂ | C₂H₆ | C₂H₄ | C₃ | C₄ | | | | | | | | |
| 17 | 1.1 | 2.1 | 36 | 24.2 | 7.5 | 2.4 | 2.7 | 970 | 30 | 35.6 | 26.2 | 12.2 | 500 | 780 |
| 20.5 | 1.2 | 3.0 | 32.5 | 23.5 | 7.5 | 2.5 | 4.4 | 390 | 30 | 36.8 | 27.5 | 13.1 | 500 | 770 |
| 22.4 | 1.3 | 8.2 | 37 | 19.0 | 4.5 | 1.2 | 2.3 | 1,160 | 30 | 33.4 | 24.0 | 8.5 | 500 | 790 |

The yield by weight are indicated as a percentage with respect to the pentane.

EXAMPLE 7

Commercial butane was treated in a tube identical with that described in the preceding example on catalyst compositions as described in the preceding example.

The tests were carried out at 5 bars, 10 bars, 20 bars and 30 bars. The values of the vapour ratio, which is the ratio of the number of water molecules per atom of carbon, was varied between 1.4 and 1.5.

The hourly volumetric speed of the entrant gas in m.³/h. (at n.t.p.) per cubic metre of catalyst varied between 500 and 2500.

The results obtained, the analysis of the departing gases as a percentage by volume and the yields by weight with respect to the initial material, as a percentage, are set out in the following Table V:

TABLE V

| Analysis of gas at outlet | | | | | | | | H₂O/C | H.v.s. gas | P. bar | Yield, C₂H₄ | | Temperatures | | |
|---|---|---|---|---|---|---|---|---|---|---|---|---|---|---|---|
| | | | | | | | | | | | Eth- ane recy- cling | With- out recy- cling | C₃H₆ | In- let, °C. | Out- let, °C. |
| H₂ | CO | CO₂ | CH₄ | C₂H₆ | C₂H₄ | C₃ | C₄ | | | | | | | | |
| 17.8 | 1.1 | 0.8 | 30.9 | 2.4 | 27.5 | 11.9 | 6.8 | 1.5 | 2,500 | 5 | 33.8 | 31.3 | 18.8 | 400 | 880 |
| 17.8 | 1.5 | 1.1 | 30.4 | 3.9 | 26.1 | 6.9 | 3.2 | 1.5 | 2,500 | 10 | 35.1 | 30.9 | 11.6 | 400 | 855 |
| 14.2 | 1 | 0.9 | 43.5 | 6.6 | 23.1 | 7.6 | 2.9 | 1.5 | 2,500 | 20 | 32.8 | 26.0 | 12.1 | 400 | 825 |
| 11.0 | 0.5 | 0.6 | 43.5 | 9.0 | 19.7 | 11.6 | 4.6 | 1.4 | 2,500 | 30 | 29.3 | 20.7 | 17.3 | 400 | 800 |

It will be seen from this table that the increase in spatial speed causes an increase in the ethylene yield. Moreover, by increasing the temperature with pressures of the order of 5 to 10 bars, the yields increase and exceed 30% by weight.

EXAMPLE 8

A light domestic fuel was treated in a tube identical with that described in Example 1 on the previously described catalyst compositions.

The results obtained are set out in the following Table VI:

TABLE VI

| Analysis of gas at outlet | | | | | | | | | H.v.s. gas | P. bar | Yield, $C_2H_4$ | | Temperatures | | |
|---|---|---|---|---|---|---|---|---|---|---|---|---|---|---|---|
| $H_3$ | CO | $CO_2$ | $CH_4$ | $C_2H_6$ | $C_2H_4$ | $C_3$ | $C_4$ | $H_2O/C$ | | | Ethane recycling | Without recycling | $C_3H_6$ | Inlet, °C. | Outlet, °C. |
| 17.2 | 0.7 | 1.0 | 21.1 | 2.4 | 39.3 | 11.3 | 6.3 | 2 | 800 | 1 | 34.9 | 33.0 | 14.2 | 600 | 850 |
| 17.0 | 0.8 | 1.1 | 19.3 | 2.2 | 40.5 | 11.7 | 6.7 | 3 | 600 | 1 | 35.7 | 34.0 | 14.7 | 450 | 850 |

What we claim is:

1. A stable catalytic composition with restricted porosity, suitable for use in the preparation of ethylene and propylene by the steam reforming of hydrocarbons prepared by solution diffused into the mass carried out by sintering at high temperatures, comprising:
a diffused solid solution of at least one oxide of the metals selected from the group consisting of the rare earth metals and antimony, as active metal, in an amount by weight as oxide of between 1 and 4%, and a refractory support of oxides therewith combined in the catalytic structure having a low porosity and a specific surface area of between 0.02 and 1 m.²/g.; said oxides of said refractory support comprising a mixture of refractory oxides with a magnesium oxide content by weight of between 30 and 70%, and a zirconium dioxide content of between 25 and 40%; said catalyst composition having high resistance to the temperatures and pressures used in the production of ethylene and propylene by the reforming of hydrocarbons with the steam; and the total catalyst composition equating 100% by weight.

2. Catalyst compositions according to claim 1 in which the rare earths are lanthanum, neodymium and cerium.

3. Catalyst compositions according to claim 1, further comprising a small content of an oxide which can be reduced, such as ferrous oxide and ferric oxide.

4. Stable catalyst compositions according to claim 1, characterized in that they contain a member of the group consisting of cobalt oxides and titanium oxides the content being between 10 and 15%.

5. Catalyst compositions according to claim 1, in which the mixture of refractory oxides contains, as well as the magnesium oxide and zirconium dioxide, at least, one oxide selected from the group consisting of calcium oxide, barium oxide, silicon dioxide, aluminum oxide and titanium oxide in a lower content by weight, which is respectively 1 to 10%, up to 2%, 6 to 16%, up to 40%, and up to 15%.

6. A stable catalytic composition in accordance with claim 1 in the form of pellets of 10–15 mm. in diameter and about 6–15 mm. in height.

7. Applications of the catalyst compositions according to claim 1, to the processes for reforming hydrocarbons, such as the light petroleum fractions, the naphtha fractions of liquefied gases, the liquid hydrocarbons such as pentane and the heavy hydrocarbons, under an effective pressure of 1 to 50 bars, with steam ratios, calculated by weight, which are between about 1 and about 5, and a volumetric speed (h.v.s.) of entrant gases as m.³/h. (at n.t.p.) per cubic metre of catalyst between 200 and 5000.

8. Applications of the catalyst compositions according to claim 7, characterised in that a fraction of the methane or ethane contained in the effluent gas is recycled.

9. Applications of the catalyst compositions according to claim 7, to the processes for reforming a volatile oil having a boiling point below 100° C., characterised in that the volumetric speed (h.v.s.) of the entrant gas in m.³/h. (at n.t.p.) per cubic metre is between 300 and 500.

10. Applications of the catalyst compositions according to claim 7, to processes for reforming butane, characterised in that the volumetric speed (h.v.s.) of the entrant gas in m.³/h. (at n.t.p.) per cubic metre is between 500 and 3000.

11. Applications of the catalyst compositions according to claim 7, to the processes for reforming propane, characterised in that the volumetric speed (h.v.s.) of the entrant gas in m.³/h. (at n.t.p.) per cubic metre is between 500 and 5000.

12. Stable catalyst compositions prepared by solution diffused into the mass carried out by sintering at high temperature of a plurality of refractory oxides characterized by a limited porosity, their specific surface being between 0.02 and 1 m.²/g., and by their resistance to the temperatures being used and to pressure, and in that they contain a high content of magnesium oxide which content is between 50 and 70% by weight and which represents the major proportion of the refractory oxides, the content of aluminum oxide being at most equal to 20% by weight and the total catalyst composition equaling 100% by weight.

13. Catalyst compositions according to claim 12, characterised in that they further contain 10 to 15% of copper oxide CuO.

14. Applications of the catalyst compositions according to claim 12, to the processes for reforming hydrocarbons, such as the light petroleum fractions, the naphtha fractions of liquefied gases, the liquid hydrocarbons such as pentane and the heavy hydrocarbons, under an effective pressure of 1 to 50 bars, with steam ratios, calculated by weight, which are between about 1 and about 5, and a volumetric speed (h.v.s.) of entrant gases as m.³/h. (at n.t.p.) per cubic metre of catalyst between 200 and 5000.

15. Applications of the catalyst compositions according to claim 14, characterised in that a fraction of the methane or ethane contained in the effluent gas is recycled.

16. Applications of the catalyst compositions according to claim 14, to the processes for reforming a volatile oil having a boiling point below 100° C., characterised in that the volumetric speed (h.v.s.) of the entrant gas in m.³/h. (at n.t.p.) per cubic metre is between 300 and 500.

17. Applications of the catalyst compositions according to claim 14, to processes for reforming butane, characterised in that the volumetric speed (h.v.s.) of the entrant gas in m.³/h. (at n.t.p.) per cubic metre is between 500 and 3000.

18. Applications of the catalyst compositions according to claim 14, to the processes for reforming propane, characterised in that the volumetric speed (h.v.s.) of the entrant gas in m.³/h. (at n.t.p.) per cubic metre is between 500 and 5000.

19. Catalyst compositions according to claim 12 further containing up to about 2.1% of an oxide which can be reduced, selected from the group consisting of ferrous oxide $Fe_2O_3$, ferric oxide $Fe_3O_4$ and mixtures thereof.

References Cited

UNITED STATES PATENTS

| | | | |
|---|---|---|---|
| 2,986,532 | 5/1961 | Gosselin | 252—457 |
| 3,353,916 | 11/1967 | Lester | 252—462 |
| 3,457,192 | 7/1969 | Houss et al. | 252—457 |
| 3,483,138 | 12/1969 | Stephens | 252—462 |
| 3,157,591 | 11/1964 | Feo et al. | 208—119 |
| 3,249,529 | 3/1966 | Viles | 208—119 |

DELBERT E. GANTZ, Primary Examiner

C. E. SPRESSER, Jr., Assistant Examiner

U.S. Cl. X.R.

23—212, 214; 208—113, 119, 121, 122; 252—457, 462, 463, 475

UNITED STATES PATENT OFFICE
CERTIFICATE OF CORRECTION

Patent No. 3,644,557    Dated February 22, 1972

Inventor(s) SENES et al.

It is certified that error appears in the above-identified patent and that said Letters Patent are hereby corrected as shown below:

Column 3, line 41 (under column A7) "28.5" should be
--38.5--

Signed and sealed this 1st day of August 1972.

(SEAL)
Attest:

EDWARD M. FLETCHER, JR.         ROBERT GOTTSCHALK
Attesting Officer               Commissioner of Patents